125,464

UNITED STATES PATENT OFFICE.

HENRY LARKIN, OF THEYDON GERNON, ANDREW LEIGHTON, OF LIVERPOOL, AND WILLIAM WHITE, OF HAMPSTEAD, ENGLAND.

IMPROVEMENT IN THE MANUFACTURE OF PURE IRON AND STEEL.

Specification forming part of Letters Patent No. 125,464, dated April 9, 1872.

*To all whom it may concern:*

Be it known that we, HENRY LARKIN, of Theydon Gernon, in the county of Essex, ANDREW LEIGHTON, of No. 16 South Castle street, Liverpool, in the county of Lancaster, and WILLIAM WHITE, of No. 30, Thurlow Road, Hampstead, in the county of Middlesex, England, subjects of the Queen of Great Britain, have invented or discovered new and useful Improvements in the Production of Iron and Steel; and we, the said HENRY LARKIN, ANDREW LEIGHTON, and WILLIAM WHITE, do hereby declare the nature of the said invention, and in what manner the same is to be performed, to be particularly described and ascertained in and by the following statement thereof; that is to say—

The object of our invention is to produce iron and steel free from deleterious impurities. For this purpose we dissolve crude iron or any suitable ore of that metal in hydrochloric acid in order to convert the contained iron into a solution of ferrous chloride, which we then purify by precipitation and crystallization and afterward decompose, reconverting the chlorine of the chloride into hydrochloric acid, which we apply to dissolve a further portion of iron or ore. When using the crude metal we either take it in the form of scrap-iron or of spongy iron, or of powder, or else, by granulation or otherwise, so disintegrate it as to cause it to present an extensive surface to the action of the acid. In the case of using an ore instead of crude metal we first roast it in the usual way, and afterward reduce it to powder. We then heat it to redness in any suitable retort or close furnace, in contact with coke, charcoal, or other suitable deoxidizing material, in order to reduce the ferric oxide either into metallic iron or into ferrous oxide, but we prefer reducing it merely to the state of ferrous oxide. It is not necessary that this operation should be conducted with any great accuracy, an approximate reduction being all that is practically needed. The black powder obtained is then exposed to the action of hydrochloric acid until the contained metal or oxide has been dissolved out, becoming converted mainly into ferrous chloride. When the ore is of such a nature that, without the preliminary operations above described, it will yield, with hydrochloric acid, a solution in which the iron exists, either for the most part or entirely as ferrous chloride, these preliminary operations may be omitted. The acid solution thus obtained is then slowly boiled in an iron or other suitable vessel with scrap or other iron as long as hydrogen continues to be evolved. This operation has the effect not only of neutralizing the excess of acid, but also of reducing the whole, or nearly the whole, of any ferric chloride contained in the solution into ferrous chloride, besides precipitating the copper if any should be contained therein. Having thus obtained a solution of ferrous chloride, we convey the same into a settling tank or tanks, which may be constructed of wood, where, when necessary or desirable, we precipitate such extraneous substances as would be of sufficient value to pay the cost of such recovery, or would be deleterious, even in minute quantities, to the iron or steel ultimately produced. Thus, if phosphorus exist in the solution, we precipitate it as ferric phosphate by the addition of ferric chloride and any suitable acetate, say acetate of sodium; if sulphur, we precipitate it as sulphate by adding the chlorides of calcium and barium—all which details are well known and commonly practiced by chemists. We then allow the solution, thus heated according to the nature of the extraneous substances it may contain, to remain in the settling tank or tanks until the precipitates formed, and all other substances held in mechanical suspension, have sufficiently subsided, when the clear liquor is drawn off into an evaporating-tank, which may be made of iron, and in which the superfluous water may be rapidly boiled off. When the boiling liquor has been sufficiently concentrated, which may be known by its beginning to crystallize on its surface, it is run off into a crystallizing-tank, in which it is allowed gradually to cool. As the liquor cools it deposits well-formed crystals, which may be readily removed. The mother-liquor is then again concentrated by boiling, and a further crop of crystals obtained. In some cases, however, in which the solution is already sufficiently purified, this process of crystallization may be dispensed with. In order to obtain metallic iron or steel and to recover the hydrochloric acid for future use, we then mix the crystals, or any sufficiently purified solution of the chloride, with broken or powdered peat, or wood saw-dust, or other suitable hydrocarbonaceous substance, and place them in a retort similar to an ordinary gas-retort, in which the mixture is brought as rapidly as convenient to a low red heat. By this means hydrogen from the peat or wood saw-dust, and from the water mingled with the chloride, is made to unite with the chlorine to form hydrochloric acid, which is conveyed from the retort and collected, in the usual manner, by means of an ordinary condensing-tower, leaving a residue consisting chiefly of iron, oxide of iron, and carbon, intimately mingled. The proportion of hydrocarbonaceous matter mixed with the chloride may vary considerably; but it is desirable that it should not greatly exceed what would be sufficient to absorb the water of crystallization given out on treating the crystals, or that contained in the solution used. When the acid has thus been removed, we cause atmospheric air to pass slowly through the retort, which is still kept at a red heat. This is continued until the residual carbon is sufficiently burned out, which may be roughly known by carbonic oxide ceasing to be evolved, and we prefer stopping the operation at such point as to leave a small excess of carbon. When the carbonic oxide ceases, or nearly ceases, to be evolved, the contents of the retort are carefully raked into a closed pit or chamber connected with the retort, in which pit it is allowed to cool without access of atmospheric air. When the whole mass is sufficiently cooled it is taken out, crushed into a fine powder, and thoroughly mixed. A portion of the material is then taken and tested, to ascertain if there is an excess of carbon. If the proportions of iron, oxide of iron, and carbon are found to be correct to produce steel of the requisite hardness, it will only be necessary to mix with the powdered material a sufficient quantity of any suitable flux to dissolve out the ash left by the charcoal, and either melt the whole down in crucibles similar to those used in the production of cast-steel, or else heat it in a deoxidized furnace to a high welding-heat, and then hammer or compress it by the usual well-known methods. If an excess of carbon be found on testing, it may be removed by adding an equivalent proportion of oxide of iron or any other suitable oxidizing material. In a similar manner iron free from carbon may be obtained, if desired. When the ore to be operated on contains a valuable percentage of copper in a readily-soluble condition, as in the case of roasted or burnt cupreous pyrites, we first dissolve out the copper with a weak solution of acid—say about one measure of ordinary commercial acid to four of water, which has little or no action on the iron—and then dissolve the iron by means of a strong undiluted solution.

Having thus described the nature of our said invention, and the manner of performing the same, we would have it understood that we claim as our improvements in the manufacture of iron and steel—

1. The treatment of the liquor obtained by dissolving iron or iron-ore in hydrochloric acid by boiling it with metallic iron, so as to obtain a neutralized solution of ferrous chloride free from ferric chloride, from which solution metallic iron or steel is obtained, substantially as described.

2. The purification of such ferrous-chloride solution by the precipitation of the phosphorus and sulphur (either or both) which it may contain, and the production of iron or steel from such purified solution, by means substantially as described.

3. The evaporation and crystallization of the solution of ferrous chloride and the reduction of such crystallized ferrous chloride into metallic iron or steel, substantially as described.

4. The treatment of the ferrous chloride by heating it with peat or other hydrocarbonaceous substance so that hydrochloric acid is driven off and recovered for use, while the ferrous chloride is decomposed and prepared for the production of iron and steel therefrom, by means substantially as described.

5. The production of iron and steel by means substantially as described.

HENRY LARKIN.
    ANDREW LEIGHTON.
    WILLIAM WHITE.

Witnesses:
 G. F. WARREN,
 WILMER M. HARRIS,
 *Both of No. 17 Gracechurch street, London.*